(12) United States Patent
Hazra et al.

(10) Patent No.: US 8,403,998 B2
(45) Date of Patent: Mar. 26, 2013

(54) METHOD AND APPARATUS FOR CONNECTION—AND NETWORK—NETWORK-INDEPENDENT ON-LINE AND OFF-LINE THEFT-MANAGEMENT PROTOCOL AND SERVICE FOR PROCESSOR BASED DEVICES

(75) Inventors: Mousumi M. Hazra, Beaverton, OR (US); Gyan Prakash, Beaverton, OR (US); Carol A. Bell, Beaverton, OR (US); Selim Aissi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1395 days.

(21) Appl. No.: 12/059,821

(22) Filed: Mar. 31, 2008

(65) Prior Publication Data
US 2009/0248827 A1   Oct. 1, 2009

(51) Int. Cl.
*H04L 29/06* (2006.01)
(52) U.S. Cl. .......................................... 726/35; 713/194

(58) Field of Classification Search ............ 726/35
See application file for complete search history.

(56) References Cited

U.S. PATENT DOCUMENTS

| | | | | |
|---|---|---|---|---|
| 6,018,800 A * | 1/2000 | Ruckdashel | ............. | 726/35 |
| 2003/0143980 A1 * | 7/2003 | Choi et al. | ............. | 455/411 |
| 2008/0022418 A1 * | 1/2008 | Wei | ............. | 726/35 |
| 2008/0034224 A1 * | 2/2008 | Ferren et al. | ............. | 713/193 |
| 2008/0141383 A1 * | 6/2008 | Bhansali et al. | ............. | 726/35 |
| 2008/0320312 A1 * | 12/2008 | Duffus et al. | ............. | 713/189 |

* cited by examiner

*Primary Examiner* — Edward Zee
*Assistant Examiner* — Yogesh Paliwal
(74) *Attorney, Agent, or Firm* — Schwabe, Williamson & Wyatt, P.C.

(57) ABSTRACT

A theft-deterrence process enabling a theft-deterrence server, remotely disposed from the processor based device, to deter or thwart theft of the processor based device, is disclosed herein. In various embodiments, the theft-deterrence process employs connection and network independent communication for at least one direction between the theft deterrence server and the processor based device.

12 Claims, 3 Drawing Sheets

METHOD AND APPARATUS FOR CONNECTION—AND NETWORK—NETWORK-INDEPENDENT ON-LINE AND OFF-LINE THEFT-MANAGEMENT PROTOCOL AND SERVICE FOR PROCESSOR BASED DEVICES

TECHNICAL FIELD

Embodiments of the disclosure relate to the field of data processing, in particular, to connection and network independent methods and apparatuses for deterring or thwarting theft of processor based devices.

BACKGROUND

With computing devices getting more and more ubiquitous and mobile, and with user-data becoming more distributed amongst laptops, desktops, servers, and handhelds, the theft of processor based devices, from desktops to mobile devices, has also increased. In response, the computing industry has developed various techniques to physically recover processor based devices, but typically these techniques employ synchronous protocols requiring a theft-management server to be in constant communication with remote devices. Thus, these techniques are often unable to address the situations where the theft-management server is located behind a firewall, and the remote devices may operate out of the environment protected by the firewall. Likewise, these techniques are unable to address the situations where the devices to be protected may not have network access at times.

BRIEF DESCRIPTION OF THE DRAWINGS

Embodiments of the disclosure will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the disclosure include, but are not limited to, methods and apparatuses for deterring theft of processor based devices.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
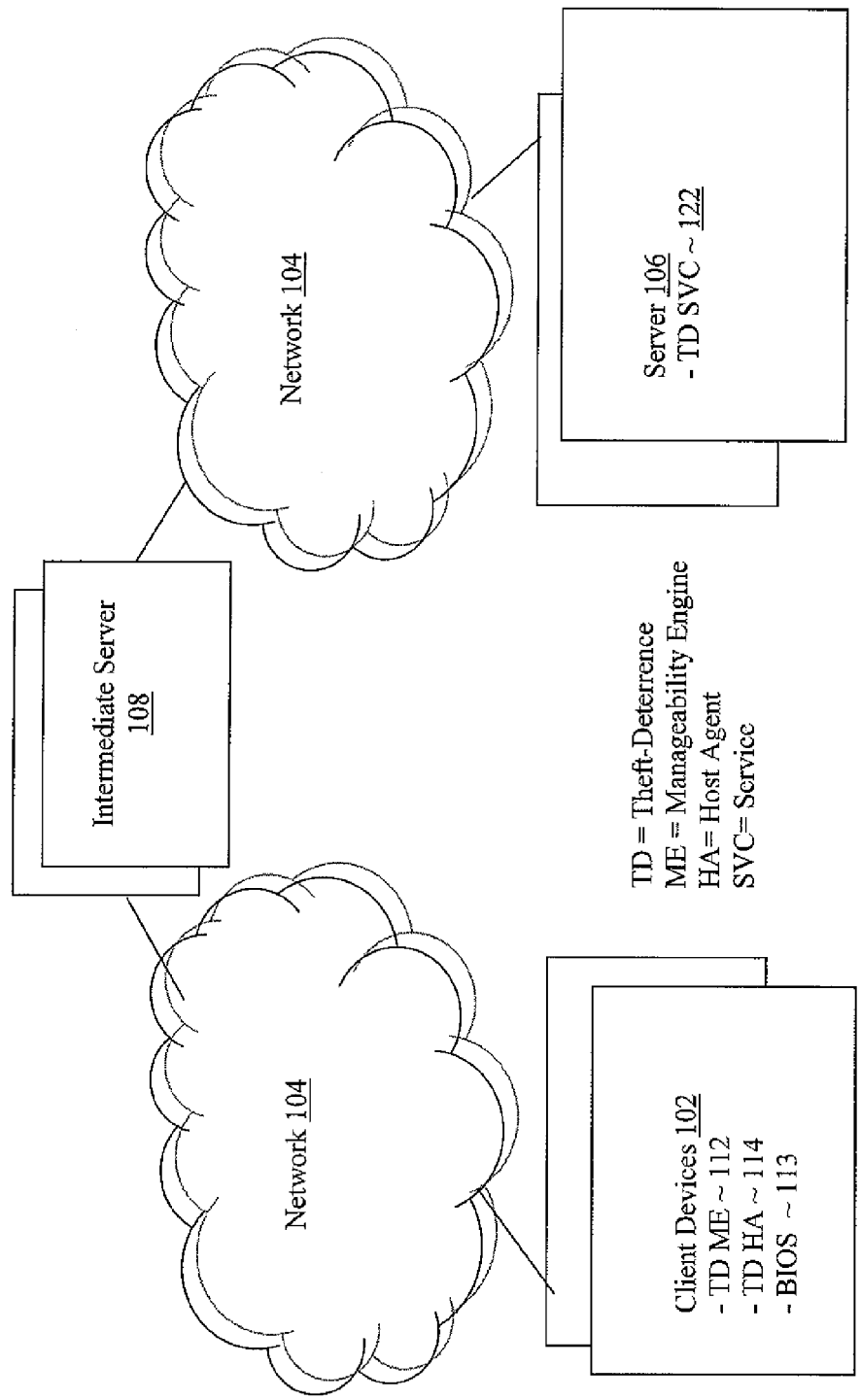
FIG. 1 illustrates an overview of various embodiments of the disclosure.

FIG. 1 illustrates an overview of various embodiments of the disclosure. As illustrated, each processor based device 102 (also referred interchangeably as client device) may be provided with a theft-deterrence enabled chipset firmware and hardware. In embodiments, the chipset firmware and hardware may be a theft deterrence manageability engine (TD ME) 112. The processor based device 102 may also be provided with a theft-deterrence host agent (TD HA) 114. In particular, TD ME 112 and TD HA 114 may be configured to jointly implement a theft-deterrence protocol with a theft-deterrence service (TD SVC) 122 which may be remotely disposed from client device 102, to deter or thwart theft of the client device 102. TD SVC 122 may be implemented on one or more remotely disposed servers 106. An intermediate server 108 may be employed to facilitate message exchanges between client device 102 and server 106. And, intermediate server 108 may be accessible from client device 102 and server 106 via network 104.

As will be described in more detail below, messages containing instructions of actions to deter or thwart theft of client device 102 may be sent from server 106 to client device 102 via intermediate server 108. TD HA 114 may be configured to assist TD ME 112 of client device 102 in the theft-deterrence protocol, including e.g. determining whether network 104 is accessible, querying intermediate server 108 for messages from TD SVC 122, and/or relaying the message to TD ME 112. TD ME 112 may be configured to verify the relayed message from TD HA 114 and instruct client device 102 to perform theft deterrence actions accordingly.

For the illustrated embodiments, TD HA 114 may be configured to operate in a processor operated application execution environment of the client device 102, whereas TD ME 112 may be configured to operate outside the application execution environment. Client device 102 may have one or more processor operated application execution environments, virtual or otherwise.

Further, client device 102 may be any one of a number of processor based devices, including but are not limited to desktop computing devices, portable computing devices (laptops as well as handhelds), set-top boxes, and game consoles. Handhelds may include, but are not limited to, personal digital assistants, digital cameras, media players, and mobile phones. Server 106 may be any number of servers, including but are not limited to blade servers. Networks 104 may include one or more private and/or public, wire line based and/or wireless, local and/or wide area networks.

Additionally, for the illustrated embodiments, each client device 102 may include a basic input/output system (BIOS) 113 configured to cooperate with TD ME 112 in implementing the theft-deterrence process on client device 102.

These and other aspects of the various embodiments, including the various elements and the manner the elements cooperate with each other to deter theft of the client devices 102, will be described in further details in turn below.

Figure 2:
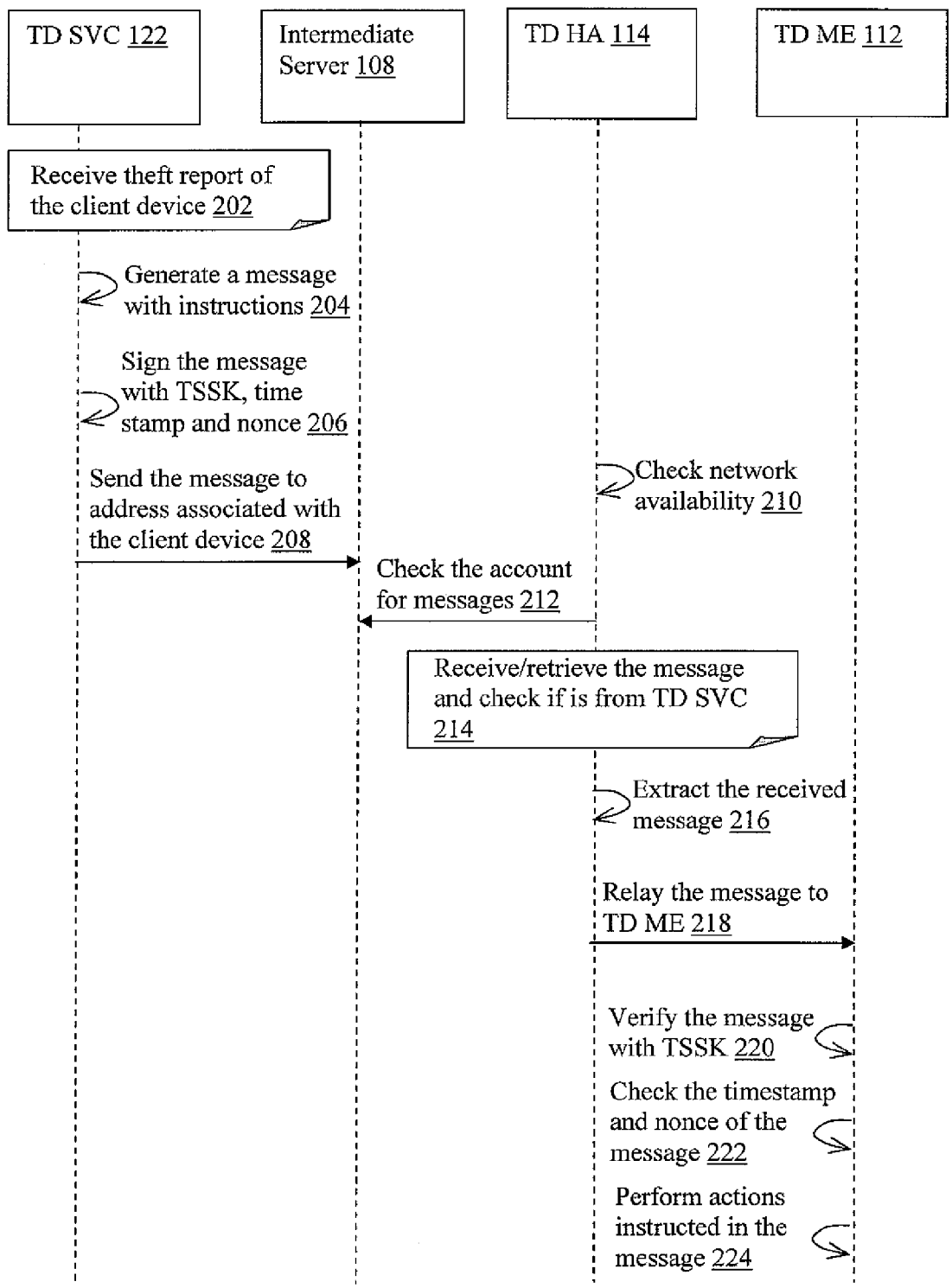
FIG. 2 illustrates selected operations of selected components to provide a processor based device a message from a theft-deterrence service, in accordance with various embodiments of the disclosure.

Referring now to FIG. 2, wherein a theft deterrence method in accordance with embodiments of the disclosure is illustrated. As shown, the method may start with TD SVC 122 receiving 202 a theft report of client device 102. In embodiments, users (or agents on behalf of the users) may log into server 106 to report theft of client device 102. In other embodiments, client device 102 may report theft of itself to server 106. In some embodiments, such reporting may be performed asynchronously, to be described further.

In response to the receipt of a theft report, TD SVC 122 may generate 204 a message with instructions of actions for client device 102 to perform in order to thwart or deter the theft. In embodiments, TD SVC 122 may sign 206 the message with a private TDT Server Signing Key ($TSSK_{private}$) which may be used to secure the communication between TD SVC 122 and TD ME 112. In embodiments, the message may also include a timestamp to indicate freshness of the message and a pre-specified High-Entropy Nonce pre-provided by client device 102 before it was stolen. After the message is signed, TD SVC 122 may send 208 the message to a communication "address" associated with client device 102. In various embodiments, the "address" may correspond to an account located at intermediate sever 108 which may be accessible via network 104. The account may hold the message for client device 102. In embodiments, the "address" may be an e-mail address or a telephone number for Short Message Service (SMS) service. Accordingly, intermediate server 108 may be an e-mail relay server or a SMS relay server. Thus, the term "address" as used herein is intended to broadly cover all forms of addresses of various forms for communication.

By virtue of the fact that TD SVC 122 provides its instructions to client device 102 indirectly via an intermediate server, with client device 102 not being started up or having access to network 104 at the time the instructions are provided. In various embodiments, when client device 102 is started up (in due course), TD HA 114 checks 210 for the availability of network 104. In embodiments, even if client device 102 may be in standby mode, TD HA 114 may wake client device 102 up at a pre-determined time to check network availability. If network 104 is available, TD HA 114 may further query intermediate server 108 through network 104 to check 212 if there are messages in the client device's account. If there are messages in the account, TD HA 114 may receive/retrieve 214 the messages and check if one of the messages is from TD SVC 122. On retrieval, TD HA 114 may extract 216 the content of the retrieved message from TD SVC 122 and relay 218 it to TD ME 112 for further operations.

Upon receiving the replayed message from TD HA 114, TD ME 112 may verify 220 the message with a public TDT Server Signing Key ($TSSK_{public}$). Also, the TD ME 112 may check 222 the timestamp included in the message for validity purpose and check the nonce to ensure it matches the one stored in client device 102. If the message fulfills the verification requirements, TD ME 112 may inform client device 102 to perform 224 actions instructed in the message. In various embodiments, the theft-deterrence actions may comprise locking client device 102. In other embodiments, the theft-deterrence actions may alternatively or additionally comprise halting all operations, partially disabling client device 102, shutting down client device 102 and preventing it from being started up, shredding or deleting data from client device 102, notifying an owner of client device 102, and/or notifying a technical support group supporting client device 102, or deleting cryptographic key material. In embodiments, client device 102 may also revive from actions taken to deter the theft upon the receipt of an updated message from TD SVC 122 informing the safe state of client device 102. And a new nonce may be provided by client device 102 to server 106 for future theft-deterrence use.

In various embodiments, as alluded to earlier, client device 102 may report theft of itself to server 106 in a similar asynchronous way which is connection and network independent as stated above. An address may be associated with server 106 so that client device 102 may send a theft report to server 106, when client device 102 determines it has access to the network, thus negating the need of server 106 to necessarily have access to the network when client device 102 makes the reporting. In various embodiments, the theft report may likewise be in the form of an e-mail or a SMS message. In embodiments, the communication between TD SVC 122 and client device 102 may be symmetric so that the theft report and the message containing theft deterrence instructions are of the same communication type. In other embodiments, it is not necessary for the communications between TD SVC 122 and client device 102 to be symmetric. For example, client device 102 may submit its theft report in the form of an email, while TD SVC 122 provides its instructions in the form of SMS messages, or vice versa.

Above embodiments are described in a way that the client device 102 has the logic to practice the theft deterrence method via TD HA 114 and TD ME 112. In other embodiments, the functions may be consolidated in a single component, or distributed further involving even more components.

Figure 3:
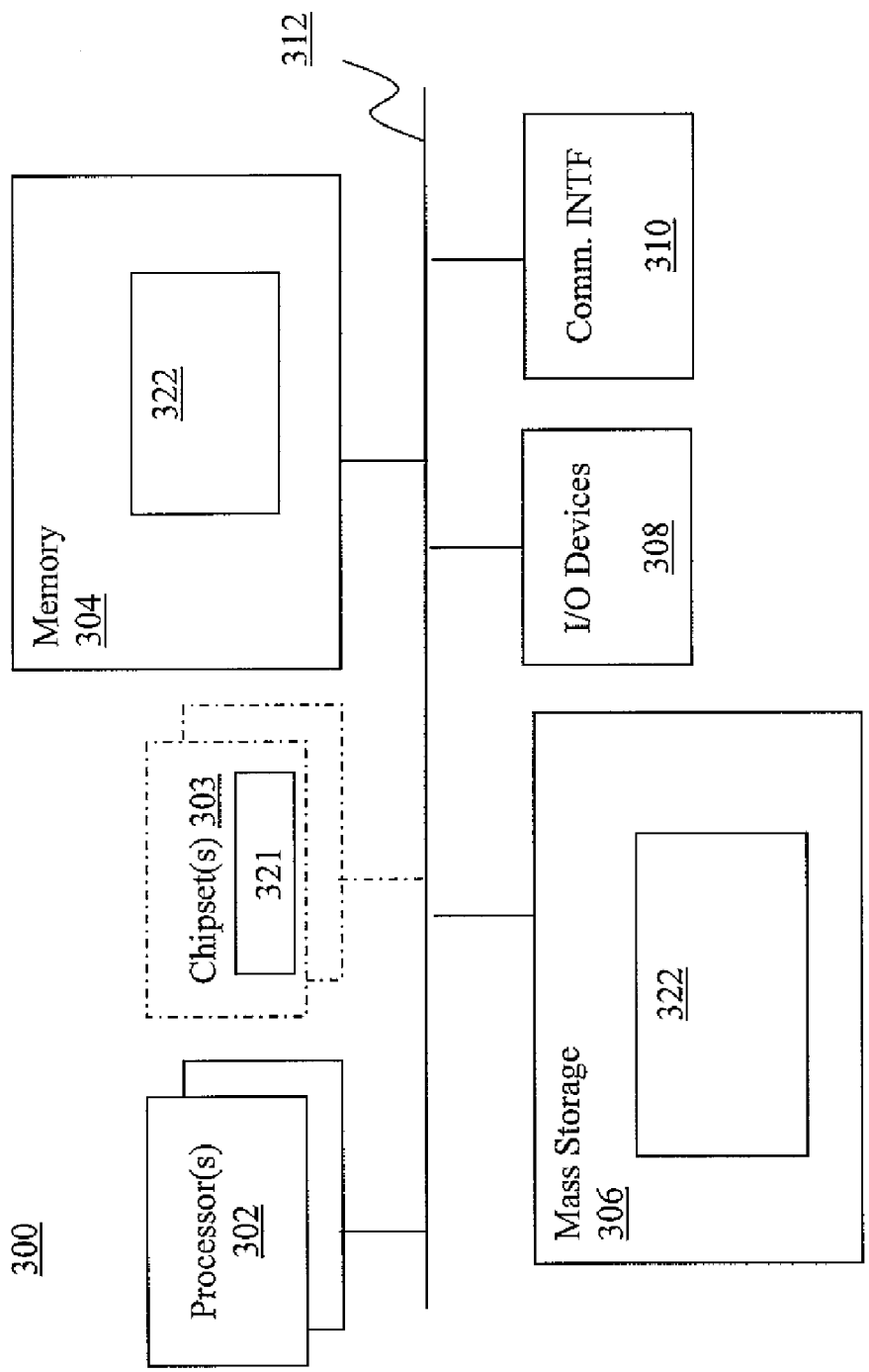
FIG. 3 illustrates an example computer system suitable for use to practice various embodiments of the disclosure.

FIG. 3 illustrates an example computer system suitable for use as a client device or a server to practice various embodiments of the present invention. As shown, computing system 300 includes a number of processors or processor cores 302, and system memory 304. For the purpose of this application, including the claims, the terms "processor" and "processor cores" may be considered synonymous, unless the context clearly requires otherwise. When use as a client device 102, computer system 300 may further include chipset 303. Additionally, computing system 300 includes mass storage devices 306 (such as diskette, hard drive, compact disc read only memory (CDROM) and so forth), input/output devices 308 (such as display, keyboard, cursor control and so forth) and communication interfaces 310 (such as network interface cards, modems and so forth). The elements are coupled to each other via system bus 312, which represents one or more buses. In the case of multiple buses, they are bridged by one or more bus bridges (not shown).

Each of these elements performs its conventional functions known in the art. In particular, chipset 303 may be employed to practice all or some of the described aspects of TD ME 112 (shown as 321). System memory 304 and mass storage 306 may be employed to store a working copy and a permanent copy of the programming instructions implementing, in whole or in part, the various other components, such as TD HA 114 (herein commonly denoted as 322). In embodiments, the functions of TD HA 114 may be incorporated into TD ME 112 to access network 104. The various components may be implemented by assembler instructions supported by processor(s) 302 or high-level languages, such as C, that can be compiled into such instructions.

In embodiments, a permanent copy of the programming instructions may be placed into permanent storage 306 in the factory, or in the field, through, for example, a distribution medium (not shown), such as a compact disc (CD), or through communication interface 310 (from a distribution server (not shown)). That is, one or more distribution media having an implementation of the agent program may be employed to distribute the agent program to various computing devices. In embodiments, the distribution medium may be an article of manufacture having programming instructions configured to implement one or more aspects of one or more methods as disclosed herein. More specifically, the article of manufacture may comprise a computer readable storage medium having the plurality of programming instructions stored in the storage medium. The programming instruction may then be read or loaded into the computer system to practice or contribute to the practice of the methods described herein to deter or thwart theft of a processor based device, through connection and network independent communication.

The constitution of these elements 302-312 are known, and accordingly will not be further described.

By adopting the asynchronous theft-deterrence protocol and corresponding devices disclosed above, impacts from device status and network availability are substantially negated, and a cost efficient way is created to implement theft-deterrence even if the stolen device is out of the secured intranet.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method, comprising:
reporting to a theft deterrent service hosted on a server, by a client device, theft of the client device, said reporting employing a first communication protocol via a first intermediate server;
receiving from the theft deterrent service, by the client device, a message containing an instruction of action, the message being provided by the theft deterrent service in response to the theft report of the client device, said providing employing a second communication protocol in which the message is addressed to and held at a second intermediate server different from the first intermediate server until the client device is connected to the second intermediate server, and being indifferent to whether the client device is active or connected to a network at the time of the server response to the theft report, wherein the second communication protocol is different from the first communication protocol; and
executing, by the client device, the action instructed.

2. The method of claim 1, wherein said receiving comprises receiving from an email server the message in a form of an email addressed to an email address of the second intermediate server, the email address associated with the client device.

3. The method of claim 2 said reporting comprises transmitting a short messaging service (SMS) message addressed to a SMS address of a first intermediate server different from the second intermediate server, the email address associated with the theft deterrent service.

4. The method of claim 1, wherein said receiving comprises receiving from a SMS service provider the message in a form of an SMS message addressed to an SMS address of the second intermediate server, the email address associated with the client device.

5. The method of claim 4 wherein said reporting comprises transmitting an email addressed to an email address of a first intermediate server different from the second intermediate server, the email address associated with the theft deterrent service.

6. A method, comprising:
receiving from a client device, by a theft deterrent service hosted by a server, a theft report of the client device, the theft report submitted employing a first asynchronous communication protocol via a first intermediate server;
generating, by the theft deterrent service, a message containing an instruction for action to be performed by the client device; and
sending to the client device, by the theft deterrent service, the generated message, employing a second asynchronous communication protocol in which the message is addressed to and held at a second intermediate server different from the first intermediate server until the client device is connected to the intermediate server, wherein the first asynchronous communication protocol is different from the second asynchronous communication protocol.

7. The method of claim 6, wherein said generating comprises generating a message to instruct the client device to purge all or selected data on the client device.

8. The method of claim 6, wherein said generating comprises generating a message to instruct the client device to halt all operations, shut down and prevent the client device from being started up again.

9. An apparatus, comprising:
a storage medium having a plurality of instructions configured to implement a theft deterrent module that, in response to execution, asynchronously report employing a first asynchronous communication protocol, to a remotely disposed theft deterrent service, a theft condition of the apparatus or a device hosting the apparatus, and asynchronously receive, employing a second asynchronous communication protocol different from the first asynchronous communication protocol, from an intermediate server in communication with the theft deterrent service, a message instructing actions to deter the theft, wherein the message is addressed to and held at the intermediate server until the client device is connected to the intermediate server; and
a processor coupled with the storage medium and configured to execute the theft deterrent reporting module.

10. The apparatus of claim 9, wherein the apparatus comprises platform management circuitry configured to manage the apparatus or the device hosting the apparatus including the apparatus, wherein the platform management circuitry comprises the storage medium, including the theft deterrent module, and the processor.

11. The apparatus of claim 9, wherein the apparatus further comprises another processor configured to operate an application environment.

12. The apparatus of claim 9, wherein the apparatus is a selected one of an integrated circuit or a circuit board.

* * * * *